(12) United States Patent
Uchihara et al.

(10) Patent No.: US 6,975,808 B1
(45) Date of Patent: Dec. 13, 2005

(54) METHOD OF RECORDING VIDEO IMAGE AND A VIDEO IMAGE RECORDING APPARATUS

(75) Inventors: Teruyuki Uchihara, Yokohama (JP); Haruo Tagawa, Tokyo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 923 days.

(21) Appl. No.: 09/715,054

(22) Filed: Nov. 20, 2000

(30) Foreign Application Priority Data

Nov. 19, 1999 (JP) ................................. 11-329797

(51) Int. Cl.⁷ ........................... H04N 5/91; H04N 7/04; H04N 7/18

(52) U.S. Cl. ...................... 386/117; 386/107; 348/143

(58) Field of Search ..................... 386/117, 118, 107, 386/46, 124, 109, 111, 112, 27, 33, 40, 38, 386/1; 348/143, 153, 159, 222.1, 207.94, 348/231.98; 360/5

(56) References Cited

U.S. PATENT DOCUMENTS 6,647,200 B1 * 11/2003 Tanaka ........................ 386/46
2001/0056579 A1 * 12/2001 Kogane et al. ............. 725/105

FOREIGN PATENT DOCUMENTS

JP        408009322 A    *   1/1996
JP        9-135458            5/1997

* cited by examiner

*Primary Examiner*—Robert Chevalier
(74) *Attorney, Agent, or Firm*—Steptoe & Johnson LLP

(57) ABSTRACT

Video data is successively received from a surveillance camera system. The video image is recorded and thinned in accordance with passage of time of each of the recorded video image. Thinning is effected by thinning frames of the recorded video image for each recording unit, wherein the thinned frames are further thinned at the later of the recording unit. More specifically, a switching circuit recurrently distributes the video image of each recording unit to each of a plurality of recording areas each the recording unit for recording. The video image in one of a plurality of the recording areas is thinned while one of a plurality of the recording areas is not used for recording the video image. The thinned video image is recorded with time relation with the video image recorded while one of a plurality of the recording areas is used for recording the video image. The video image and thinned video image in each of recording areas are composed (connected) with each other in accordance with passage of time of the video image and thinned video image to reproduce a stream of time passage video image. Moreover, time data is generated and attached to each frame of the video image to be recorded with the video image.

15 Claims, 5 Drawing Sheets

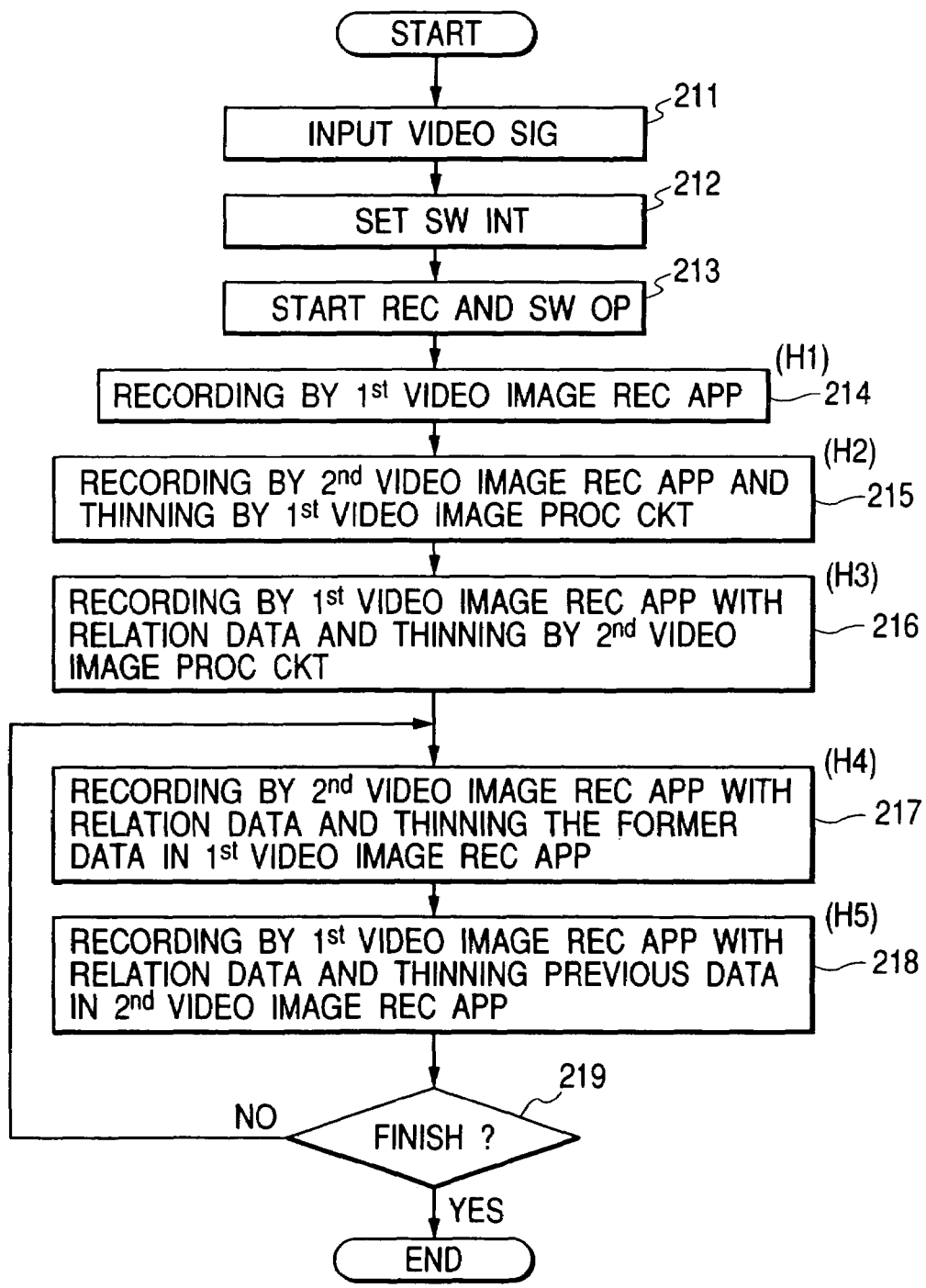

METHOD OF RECORDING VIDEO IMAGE AND A VIDEO IMAGE RECORDING APPARATUS

BACKGROUND OF THE INVENTION

1. Field of the Invention

This invention relates to a method of recording video image and a video image recording apparatus and particularly to a method and a recording apparatus for recording video image from a surveillance video camera system.

2. Description of the Prior Art

A video image recording apparatus for recording video image (video image) from a surveillance video camera is known. Japanese patent application provisional publication No. 9-135458 discloses a surveillance video image recording apparatus. In this apparatus, when motion is detected in the video image, the video image is thinned and stored in the memory. At the same time, after a first interval, the video image in the memory is successively read up to a predetermined interval to supply the video image and then, the video image is switched to the presently shot video image to remove time lag.

SUMMARY OF THE INVENTION

The aim of the present invention is to provide a superior method of recording video image and a superior video image recording apparatus.

According to the present invention, a first aspect of the present invention is a method of recording video image comprising the steps of: successively receiving video image from a surveillance camera system; recording said video image; and thinning said recorded video image in accordance with passage of time of each of said recorded video image to output said thinned video image and said recorded video image.

Preferably, said step of thinning comprises the step of: thinning frames of said recorded video image for each recording unit, wherein said step of thinning frames is further thinned at a later recording unit.

Preferably, said step of recording comprises the step of: recurrently distributing and recording said video image of each recording unit of said video image to each of a plurality of recording areas each said recording unit, said video image in one of a plurality of said recording areas (means) being thinned while said one of a plurality of said recording areas is not used for recording said video image. In this case, step of recording said thinned video image with time relation with said video image recorded while said one of a plurality of said recording areas is used for recording said video image may be further provided.

Preferably, the method further comprises the steps of: connecting said video image to thinned video image in each of recording areas in accordance with passage of time of said video image and thinned video image.

Preferably, the method further comprises the steps of: generating time data; attaching said time data to each frame of said video image to be recorded with said video image.

According to the present invention, a second aspect of the present invention is a video image recording apparatus comprising: a plurality of recording means for recording video image; switching means for switching said recording means to recurrently record said video image in each of said recording means each recording unit; and thinning means for thinning said video image in one of said recording means while said one of said recording means is not used for recording said video image.

Preferably, the video image recording apparatus, further comprises: recording means for recording said thinned video image with time relation with said video image recorded while said one of a plurality of said recording means is used for recording said video image. In this case, connecting means for connecting said video image and thinned video image in each of recording areas in accordance with passage of time of said video image and thinned video image to output said connected video image may be further provided. Moreover, reproducing means for reproducing said connected video image may be further provided.

Preferably, the video image recording apparatus further comprises: generating means for generating time data; and data attaching means for attaching said time data to each frame of said video image.

BRIEF DESCRIPTION OF THE DRAWINGS

The object and features of the present invention will become more readily apparent from the following detailed description taken in conjunction with the accompanying drawings in which:

FIG. 2 depicts a flow chart illustrating the operation of the video image recording apparatus according to the first embodiment;

The same or corresponding elements or parts are designated with like references throughout the drawings.

DETAILED DESCRIPTION OF THE INVENTION

Hereinbelow a video image apparatus and a method of recording video image according to a first embodiment of this invention will be described.

Figure 1A:
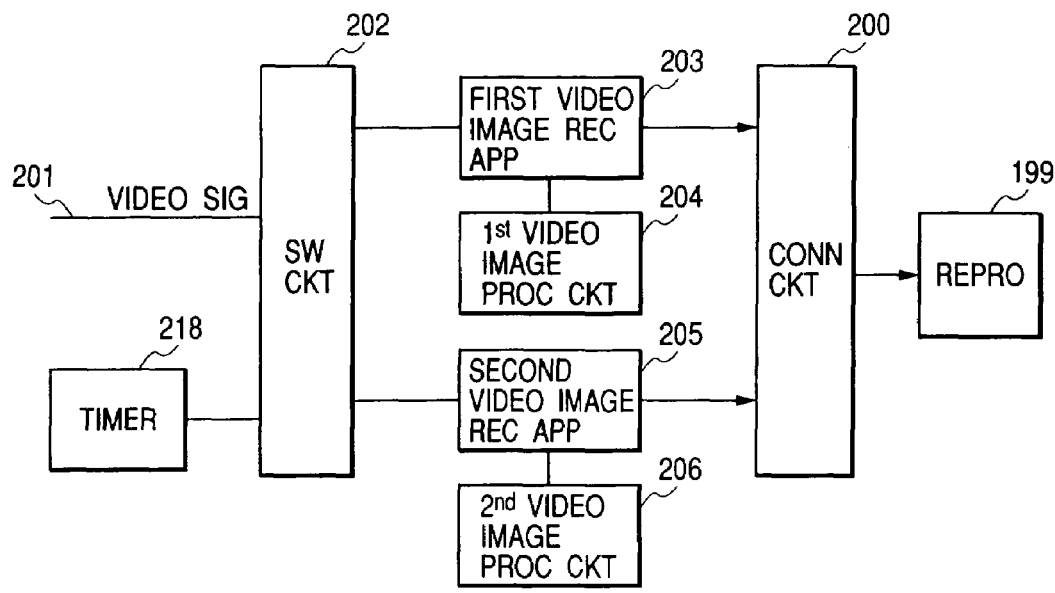
FIG. 1A is a block diagram of a video image recording apparatus according to a first embodiment of the present invention.
Figure 1B:
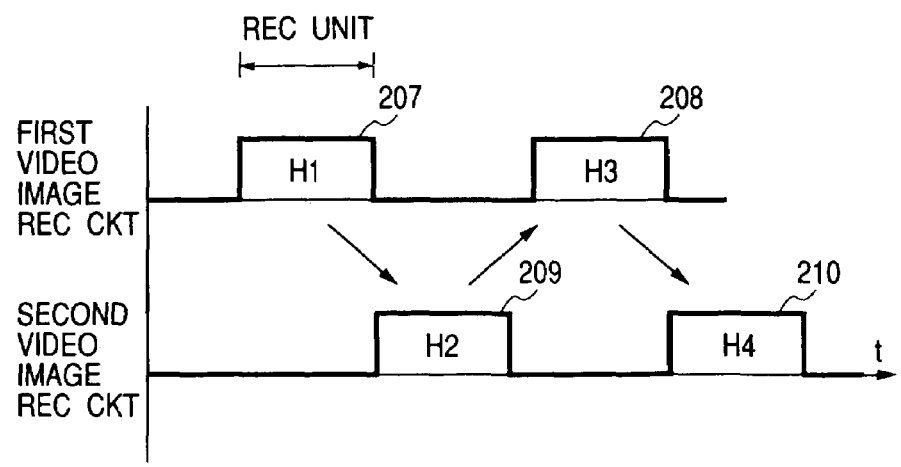
FIG. 1B is a time chart of recording operation of the video image recording apparatus according to the first embodiment.
Figure 3:
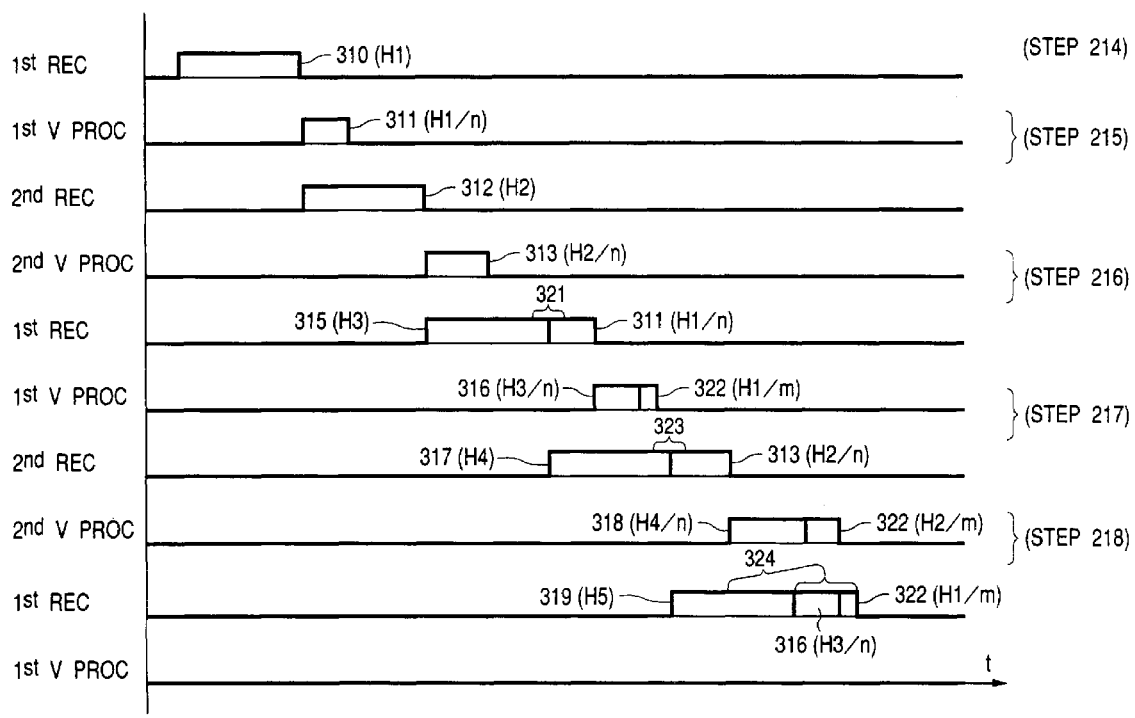
FIG. 3 is a time chart illustrating the recording and thinning operations.

FIG. 1A is a block diagram of a video image recording apparatus according to the first embodiment of the present invention. FIG. 1B is a time chart of recording operation of the video image recording apparatus. FIG. 2 depicts a flow chart illustrating the operation of the video image recording apparatus according to the first embodiment. FIG. 3 is a time chart illustrating the recording operation.

The video image apparatus according to the first embodiment includes a switching (distributing) circuit 202, a timer 218 for generating time data including date and time data, first and second video image recording apparatus 203 and 205, first and second video image processing circuits 204 and 205. Further, a connection circuit 200 and a reproducing circuit may be provided. The switching circuit 202 receives a video signal (video image) 201 from a surveillance video camera system, alternately or recurrently supplies the video image to the first and second video image recording apparatus 203 and 205 every predetermined recording unit (a predetermined number of frames), and attaches the time data to each frame of the video image. The first and second video image processing circuits 204 and 206 control frames in the video image recording apparatus 203 and 205, respectively.

At first, the switching circuit 202 successively receives the video signal (real time data) 201 from the surveillance camera system (not shown) and supplies the video image and the time data to the first video image recording apparatus 203 for a predetermined interval (recording unit), for example, the interval H1. The first video image recording apparatus 203 records the video image and the time data for the interval H1. Then, switching circuit 202 switches the connection to the second video image recording apparatus 205. Then, the second video image recording apparatus 205 records the video image of the following interval H2 and the time data for the interval H2. Again, the switching circuit 202 switches the connection to the first video image recording apparatus 203 at the end of the interval H2. This operation is repeated. Thus, the switching circuit 202 alternatively or recurrently distributes the video image and the time data to each of the first and second video image recording apparatus 203 and 205 every recording unit.

The first video image processing circuit 204 thins the recorded data in the recording apparatus 203, that is, the recorded data on the recording medium in the first video image recording apparatus 203, while the video image is supplied to the second video image recording apparatus 205 and the first recording apparatus 203 stops (not used for) recording the video image from the switching circuit 202. More specifically, the first video image processing circuit 204 omits a portion of frames of the recorded video image in the first video image recording apparatus 203 at the recording unit at a predetermined rate.

The second video image processing circuit 206 thins the recorded data in the first recording apparatus 205, that is, the recording medium in the second video image recording apparatus 205, while the video image is supplied to the video image recording apparatus 203 and the second video image recording apparatus 205 stops recording the video image from the switching circuit 202. More specifically, the second video image processing circuit 206 omits a portion of frames of the recorded video image in the second video image recording apparatus 205 at the recording unit at the predetermined rate.

In FIGS. 2 and 3, the video image recording apparatus receives the successive video signal with the switching circuit 202 in step 211 and sets the predetermined interval of the recording unit, or a predetermined number of frames of the video signal in step 212. In step 213, the video image recording apparatus starts recording and switching operations.

In step 214, the video image is recorded as video image 310 by the first video image recording apparatus 203 for the predetermined interval (H1).

In step 215, the second video image recording apparatus 205 records the video image 312 for the next interval (H2). During this, the first video image processing circuit 204 thins the recorded data in the first video image recording apparatus 203 as thinned video image 311 (H1/n).

In step 216, the first video image recording apparatus 203 records the video image 315 for the next interval (H3). Moreover, a time (connection) relation between the video image 315 recorded in this step and the thinned video image 311 (H1/n) as relation data 321 is also recorded. During this, the video image 312 recorded in the second video image recording apparatus 205 is thinned by the second video processing circuit 206 (H2/n) as thinned data 313.

In step 217, the second video image recording apparatus 205 records the video image 317 for the next interval (H4) and then, a time relation 323 between the video image recorded in this step and the thinned video image 313 is also recorded (H4+H2/n). During this, the video image 315 (H) in the first video image recording apparatus 203 and the former thinned video image 311 are thinned by the first video processing circuit 204 as the thinned video image 316 and 322 (H3/n+H1/m).

In step 218, the first video image recording apparatus 203 records the video image 319 for the next interval (H5) and then, a time relation 324 between the video image 319 recorded in this step and the thinned video image 316 and 322 is recorded (H3/n+H1/m). During this, the second video image processing circuit 206 thins the video image 317 and the thinned video image 313 thinned in step 217 as thinned data 318 and 322 (H4/n+H2/m).

In step 219, if the recording operation has finished, processing ends. If the recording operation is continued, processing returns to step 217 and repeats the operations of the steps 217 and 218.

The relation data 321, 323, 324 are recorded at a data area in the last frame in the recoding unit. Moreover, the relation data 321, 323, 324 may be stored in a table. Further, the relation data includes the time data of the related data or includes connection data of the recorded video image and the former video image to be connected thinned data, that is, the frame number or address data of the present video image and the frame number or address data of the thinned video image to be connected.

The first and second video image processing circuits 204 and 206 thin the video image at first at the rate of 1/n and at the second, the total thinning rate is 1/m. In this operation n<m, so that the total recording time interval is shortened. For example, the video image is thinned at a rate of ½, ¼, or ⅛ in accordance with the use to provide the thinned data.

The first video image recording apparatus 203 and the second video recording apparatus 205 output the recorded video image and the thinned video image.

Further, the connection circuit 200 may be provided to connect (compose) the video image from the first video image recording apparatus 203 with the video image from the second video image recording apparatus 205 to provide video image stream.

Figure 4:
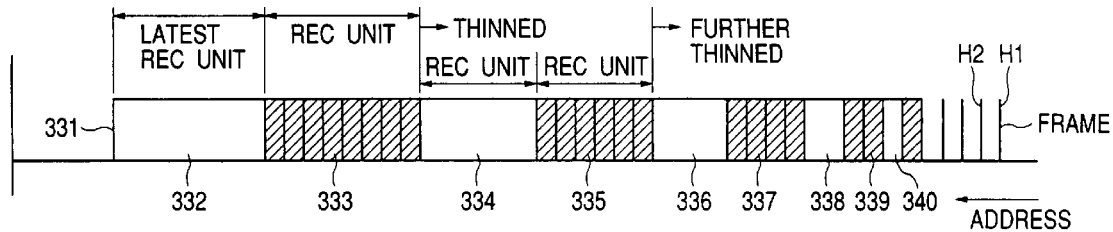
FIG. 4 is an illustration of the composed data according to the first embodiment.

FIG. 4 shows a data stream of the connected video image 331. The connection circuit 200 connects the video image by successively and alternately reads the video image from the first and second video image recording apparatus 203 and 205 with referring the relation data or the time data.

In FIG. 4, the top portion includes the video image 322 from the first video image recording apparatus 203 for the latest recording unit and successively includes the video image 323 recorded by the second video image recording apparatus 205 at a regular frame rate. At the consecutive recording units 334 and 335, the number of frames is reduced to six from eight for example. Further, the next recording units 336 and 337, the number of frames is reduced to four. When the number of frame in each recording unit reaches one, further thinning is stopped to remain the least information. The connected video image is supplied to the reproducing unit 199 to provide reproduced image of which frame rate is gradually reduced in accordance with passage of thymes of the video image.

As mentioned above, the first and second video image recording apparatus 203 and 205 are switched for recording and each of the first and second video image processing circuits 204 and 206 thins (drops) the frames of the video image recorded the just previous predetermined interval H and records the thinned video image. Moreover, the once thinned video image is further thinned during the next recording OFF interval. Thus, the remaining frame rate decreases in accordance with the passage of time. Finally, at the recording unit, that is, the predetermined interval, there is one frame video image is left. Then, the video image recording apparatus stops the thinning operation to such video image to leave the minimum number of frame at the recording unit.

Moreover, alternately reading the video image from the first video image recording apparatus 203 and from the second video image recording apparatus 205 provides connection of the video image of odd frames with the video image of even frames to provide video image stream of which frame rate is reduced in accordance with passage of time.

In this embodiment, if a hard disc drive unit is used for the first and second video image recording apparatus 203 and 205, the plurality of (two) recording areas in the only one hard disc drive unit are used as the medium of the first and second video image recording apparatus 203 and 205. That is, one recording area is used for recording the present video image and the other is used for thinning the video image.

SECOND EMBODIMENT

Figure 5:
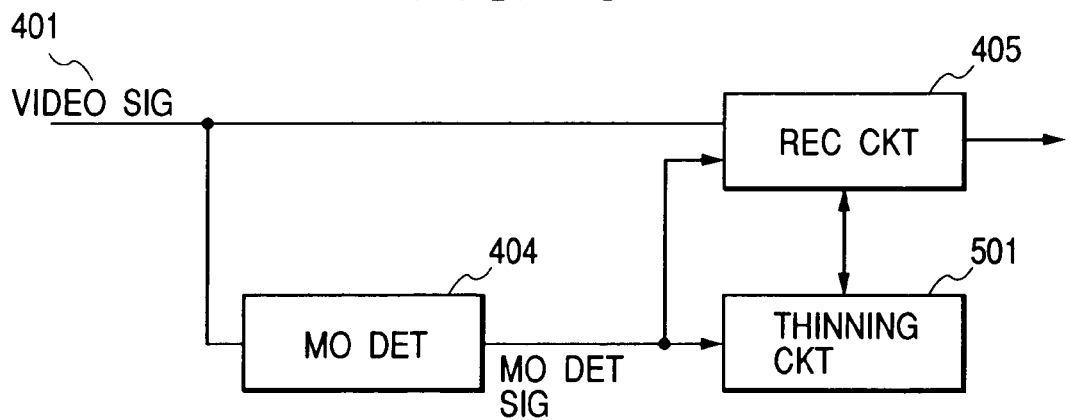
FIG. 5 is a block diagram of a video image recording apparatus according to a second embodiment.

FIG. 5 is a block diagram of a video image recording apparatus according to a second embodiment.

The video image recording apparatus according to the second embodiment includes a motion detection circuit 404 for detecting motion in the video signal 401 from a surveillance video camera system and a recording circuit 405 for recording the frame of the video signal when the motion detection circuit 404 detects motion in the video signal of the frame.

Thus, the frame of the video signal in which motion is detected is recorded by the recording circuit 405. If the fame of the video image is a still image, i.e., the frame of the video signal 404 of which motion is not detected, the recording circuit 405 does not record the frame of the video signal.

Figure 6:
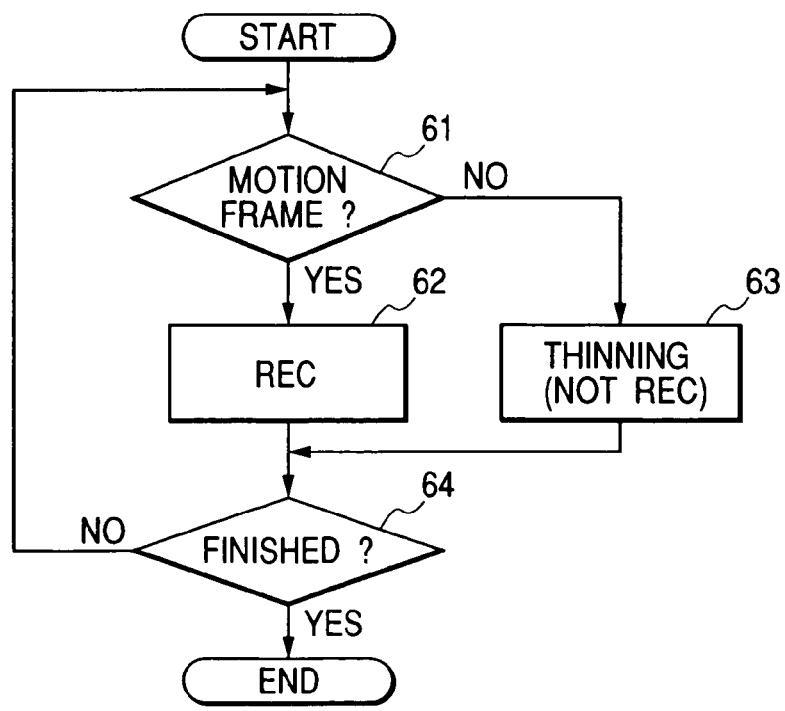
FIG. 6 depicts a flow chart of the video image recording process according to the second embodiment.

FIG. 6 depicts a flow chart of the video image recording apparatus according to the second embodiment.

In step 61, the video image recording apparatus judges whether there is variation (motion) between the present frame and the previous frame of the video. If three is variation (motion), the video image recording apparatus records the video image of the present frame in step 62. If there is no variation (motion) in step 61, the video image recording apparatus thins the video image in step 63. More specifically, the video image recording apparatus does not record the video image of the present frame in step 63. In step 64 if the recording has finished, processing ends. If no, processing returns to step 61 to repeat the operation of the steps 61, 62, 63, and 64. Thus, the video image is thinned in accordance with the motion detection.

As mentioned above, in the first embodiment, the video image (signal) 201 is successively received from a surveillance camera system. The video image is recorded by the first and second video image recording apparatus 203 and 205 and thinned in accordance with passage of time of each of the recorded video image by the video image processing circuits 204 and 206. Thinning is effected by thinning (omitting) frames of the recorded video image for each recording unit. The thinned frames are further thinned at the later recording unit. More specifically, the switching circuit 202 recurrently distributes the video image of each recording unit to each of a plurality of recording areas (video image recording apparatus 203 and 205) each the recording unit for recording. The video image in one of a plurality of the recording areas is thinned while one of a plurality of the recording areas is not used for recording the video image. The thinned video image is recorded with time relation with the video image recorded while one of a plurality of the recording areas is used for recording the video image. The video image and thinned video image in each of recording areas are connected with each other in accordance with passage of time of the video image and thinned video image to reproduce a stream of time passage video image as shown in FIG. 4. Moreover, time data is generated and attached to each frame of the video image to be recorded with the video image.

In the first embodiment, the first and second video image recording apparatus 203 and 205 are used. However, a time-sharing operation of recording and thinning with one hard disc unit and a memory eliminates the use of two recording apparatus. That is, a plurality of recording areas in a hard disc unit are used as a plurality of video image recording apparatus.

What is claimed is:

1. A method of recording video images comprising:
   successively receiving a plurality of video images from a surveillance camera system;
   recording a first one of said video images received at a first time and a second one of said video images received at a second time later than the first time; and
   thinning each of said recorded video images to form thinned video images, and outputting such thinned video images, wherein
   a thinning rate for the first one of said video images is higher than a thinning rate for the second one of said video images.

2. The method as claimed in claim 1, wherein thinning comprises:
   thinning frames of each recorded video image for a predetermined number of frames, wherein
   further thinning said thinned frames while a later predetermined number of frames is being recorded.

3. The method as claimed in claim 1, wherein recording comprises:
   recurrently distributing and recording video images to a plurality of recording areas; and
   said thinning comprises thinning a video image recorded in one of said recording areas when said one of said recording areas is not used for recording said video image.

4. The method as claimed in claim 3, wherein recording comprises:
   recording a thinned video image and a timing relationship between the recorded thinned image and one of the recorded video images when one of said recording areas is used for recording a thinned video image.

5. The method as claimed in claim 1, further comprising:
   composing one of video images and a thinned video image in each of said recording areas while said composed video image and said composed thinned image are being recorded.

6. The method as claimed in claim 1, further comprising:
generating time data; and
attaching time data to each frame of video images to be recorded with video images.

7. A video image recording apparatus comprising:
a plurality of recording means for recording video images;
switching means for switching said recording means for recurrently recording a video image in each of said recording means every predetermined number of frames; and
thinning means for thinning each of recorded video images in one of said recording means while one of said recording means is not used for recording a video image.

8. The video image recording apparatus as claimed in claim 7, further comprising:
recording means for recording a timing relationship between a thinned video image and a video image recorded while said one of a plurality of said recording means is used for recording a video image.

9. The video image recording apparatus as claimed in claim 8, further comprising:
composing means for composing a video image and thinned video image in each of recording areas in accordance with a timing relationship between a video image and a thinned video image, to output a composed video image.

10. The video image recording apparatus as claimed in claim 9, further comprising:
reproducing means for reproducing said composed video image.

11. The video image recording apparatus as claimed in claim 7, further comprising:
generating means for generating time data; and
data attaching means for attaching time data to each frame of video images.

12. The method as claimed in claim 1, wherein recording video images comprises:
recording a present frame of one of video images when there is variation between the present frame and a previous frame of a video image preceding the present frame; and
not recording the present frame when there is no variation between the present frame and the previous frame.

13. The method as claimed in claim 12, wherein thinning of each of recorded video images comprises:
thinning each of the recorded video images over time while the present frame is not being recorded.

14. The method as claimed in claim 13, further comprising:
stopping thinning each recorded video image when a minimum number of frames is left in the recorded video image.

15. The video image recording apparatus as claimed in claim 7, wherein each of the recording means is for recording a present frame of one of video images when there is variation between the present frame and a previous frame of the video image preceding the present frame, and each of the recording means is for not recording the present frame when there is no variation between the present frame and the previous frame.

* * * * *